United States Patent [19]

Mangels

[11] 4,356,136

[45] Oct. 26, 1982

[54] METHOD OF DENSIFYING AN ARTICLE FORMED OF REACTION BONDED SILICON NITRIDE

[75] Inventor: John A. Mangels, Flat Rock, Mich.

[73] Assignee: Ford Motor Company, Dearborn, Mich.

[21] Appl. No.: 182,351

[22] Filed: Aug. 29, 1980

[51] Int. Cl.$^3$ .............................................. C04B 35/58
[52] U.S. Cl. ....................................... 264/65; 264/85; 501/97; 501/103; 501/122; 501/152
[58] Field of Search ........................... 264/65, 85, 325; 501/97

[56] References Cited

U.S. PATENT DOCUMENTS

| | | | |
|---|---|---|---|
| 4,179,486 | 12/1979 | Lange | 264/65 |
| 4,209,478 | 6/1980 | Wooten et al. | 264/65 |
| 4,280,973 | 7/1981 | Moskowitz | 264/65 |
| 4,285,895 | 8/1981 | Mangels et al. | 264/65 |
| 4,296,065 | 10/1981 | Ishii et al. | 264/325 |

*Primary Examiner*—James H. Derrington
*Attorney, Agent, or Firm*—William E. Johnson; Olin B. Johnson

[57] ABSTRACT

A method of densifying an article formed of reaction bonded silicon nitride is disclosed. The reaction bonded silicon nitride article is packed in a packing mixture consisting of silicon nitride powder and a densification aid. The reaction bonded silicon nitride article and packing powder are sujected to a positive, low pressure nitrogen gas treatment while being heated to a treatment temperature and for a treatment time to cause any open porosity originally found in the reaction bonded silicon nitride article to be substantially closed. Thereafter, the reaction bonded silicon nitride article and packing powder are subjected to a positive high pressure nitrogen gas treatment while being heated to a treatment temperature and for a treatment time to cause a sintering of the reaction bonded silicon nitride article whereby the strength of the reaction bonded silicon nitride article is increased.

15 Claims, No Drawings

METHOD OF DENSIFYING AN ARTICLE FORMED OF REACTION BONDED SILICON NITRIDE

STATEMENT

The invention herein described was made in the course of or under a contract or subcontract with NASA, Contract #DEN3-167, Subcontract P1928150.

BACKGROUND OF THE INVENTION AND PRIOR ART STATEMENT

I have been working in the area of manufacturing components for gas turbine engines from silicon nitride. In such applications, it is desired to obtain the maximum strength from the silicon nitride material as that material is subjected to severe operating conditions as a component of the hot gas flow path of such a turbine engine. I have been attempting to manufacture complex shaped, high density, reaction bonded silicon nitride articles for use, for example, as the rotor of a gas turbine engine.

The process of this specification is one by which high density silicon nitride articles of complex shape can be made. A complex shaped, reaction bonded silicon nitride article of moderate density can be made by methods already known in the art, such as injection molding and slip casting processes. By the process of my invention, the thus made reaction bonded silicon nitride article of moderate density is sintered so that the strength and density are increased. During the sintering, there is some slight shrinkage of the article, but not such a significant amount of shrinkage as will produce distortion, cracking or other failures in the article.

By sintering, I mean the following. During a sintering and densification operation, the particles of a powder first form necks between adjacent particles which become the grain boundaries. Between the grain boundaries, a liquid phase may exist. The densification proceeds by a reduction in the number and size of the spaces or pores between the particles as they migrate into these grain boundaries through a transport mechanism which is followed by a partial collapse or moving together of the center points of the grains thus producing densification.

In the method of this invention, I can tolerate a small degree of shrinkage of the article from its as-formed state; I mean a reaction bonded silicon nitride article which has been made through a process in which materials such as silicon particles are slip cast to form a particular configuration and thereafter nitrided or wherein materials such as silicon particles are injection molded with a suitable binder, subjected to a pyrolizing operation and thereafter nitrided. The article is not a reaction bonded silicon nitride article until after the silicon particles have been nitrided in a nitriding operation. By using either slip cast or injection molding techniques, I can make an article of complex configuration such as a rotor for a gas turbine engine. By knowing that the rate of shrinkage is going to be controlled, I can specifically make the as-formed article larger than desired so that when the densification and associated shrinkage takes place, the fully densified article will have the dimensions desired in the final article, or be so close thereto that they may be readily machined to the final desired dimensions.

No prior art search was conducted on the subject matter of this application in the U.S. Patent Office. The closest prior art that I am aware of is commonly assigned Ser. No. 078,129 filed Sept. 24, 1979 now U.S. Pat. No. 4,285,895, for a "Method of Densifying a Reaction Bonded Silicon Nitride Article." Briefly, that application discloses a method of densifying a reaction bonded silicon nitride article by a method in which a densification aid is incorporated into a reaction bonded silicon nitride article. The so-made reaction bonded silicon nitride article is enclosed in a chamber which also contains a mixture of silicon nitride powder and powder the same as the densification aid incorporated into the reaction bonded silicon nitride article. The reaction bonded silicon nitride article, and the powder mixture associated therewith, is subjected to a nitrogen gas pressure sufficient to prohibit a significant volatilization of silicon nitride at a sintering temperature. The reaction bonded silicon nitride article, the powder mixture, and the nitrogen gas associated therewith are heated to a temperature above 1700° C. for a time sufficient to permit sintering of that article whereby the strength of the reaction bonded silicon nitride article is increased. In accordance with preferred teachings, the densification aid can be selected from the group of materials consisting of magnesium oxide, yttrium oxide, cerium oxide and zirconium oxide.

SUMMARY OF THE INVENTION

This invention relates to a method of treating a reaction bonded silicon nitride article and, more particularly, to a method of densifying a reaction bonded silicon nitride article after that article has been formed by reaction sintering of silicon particles which have been formed into the shape of the article.

In accordance with the preferred teachings of the method of this invention, a reaction bonded silicon nitride article is densified in the following manner. The reaction bonded silicon nitride article is formed by reaction sintering of silicon particles formed into the shape of the article. The reaction bonded silicon nitride article is packed in a packing mixture consisting of silicon nitride powder and a densification aid. The reaction bonded silicon nitride article and packing powder are subjected to a positive, low pressure nitrogen gas treatment while the reaction bonded silicon nitride article, packing powder and nitrogen are heated to a treatment temperature and for a treatment time to cause any open porosity originally found in the reaction bonded silicon nitride article to be substantially closed. Thereafter, the reaction bonded silicon nitride article and packing powder are subjected to a positive, high pressure nitrogen gas treatment while the reaction bonded silicon nitride article, packing powder and nitrogen gas are heated to a treatment temperature and for a treatment time to cause a sintering of the reaction bonded silicon nitride article whereby the strength of the reaction bonded silicon nitride article is increased.

In accordance with preferred teachings of the method of this invention, the densification aid is selected from the group consisting of magnesium oxide, yttrium oxide, cerium oxide and zirconium oxide. The packing mixture generally consists of from about 4% to 20% by weight of the densification aid, the balance consisting essentially of silicon nitride powder. If desired, the reaction bonded silicon nitride article may have a densification aid incorporated therein prior to its being packed in the packing mixture.

As an alternative method, if the reaction bonded silicon nitride article has a densification aid incorporated therein, it is only necessary that the article be enclosed in a chamber which also contains a packing mixture consisting essentially of silicon nitride powder and a powder the same as the densification aid incorporated into the reaction bonded silicon nitride article in order to achieve a densifiying of the reaction bonded article by use of the method described above.

In accordance with further detailed teachings of this invention where yttrium oxide is used as the densification aid, the low pressure nitrogen gas treatment is carried out at a pressure in a range from a positive nitrogen pressure to about 15 psi, at a treatment temperature in a range from about 1825° C. to about 1875° C., and for a treatment time from about one-half to six hours. The high pressure nitrogen gas treatment is carried out in a pressure in a range from about 300 psi to 1500 psi, at a treatment temperature in a range from about 1875° C. to 2000° C., and for a treatment time from about one-half to four hours. If magnesium oxide is used as the densification aid, then treatment times and pressures remain the same, but the low pressure treatment temperature is in the range of 1700° C. to 1800° C., and the high pressure treatment temperature is in the range of 1750° C. to 1850° C.

DESCRIPTION OF THE PREFERRED EMBODIMENTS

The novel features that are considered characteristic of the invention are set forth with particularity in the appended claims. The invention itself, however, both as to its organization and its method of operation, together with additional objects and advantages thereof, will best be understood from the description of specific embodiments.

EXAMPLE 1

Test specimens, including thin specimens $1'' \times 1'' \times \frac{1}{4}''$, and individual cubes of $1'' \times 1'' \times 1''$, are cut from a slip cast, reaction bonded silicon nitride billet containing 8 weight percent yttrium oxide. These billets are made by mixing silicon and yttrium oxide with water. This mixture is slip cast into a plaster mold. The cast billets are then air dried for about one week at room temperature during which time most of the moisture is removed from the billet. The billets are then nitrided at temperatures up to 1400° C. in a nitrogen atmosphere to form silicon nitride. The nitrided density of the billets and test specimens made therefrom range from 2.33 g/cc to 2.47 g/cc. The test specimens are placed in a silicon nitride crucible containing a packing powder composed of 9% by weight yttrium oxide and 91% by weight silicon nitride. The test specimens are buried in the packing powder. The crucible is then placed in a graphite resistance heated furnace which is then heated to a temperature of 1875° C. under a nitrogen over-pressure of 15 psi. The temperature and pressure is held at these conditions for four hours. This low pressure nitrogen gas treatment causes any of the open porosity originally found in the reaction bonded silicon nitride specimens to be substantially closed.

After this first low pressure treatment, the pressure within the chamber is increased to 300 psi over-pressure nitrogen, while the temperature is thereafter increased to 1925° C. and held under these conditions for two hours. This high pressure nitrogen gas treatment is effective to cause a sintering of the reaction bonded silicon nitride specimens whereby the strength of the reaction bonded silicon nitride specimens is increased.

Upon cooling, all the specimens are found to have undergone a linear shrinkage in the range of about 8% to 10.6%, depending upon their original nitrided density. A weight loss of 0.8 to 1.7% was also observed for the specimens. The density of all the specimens was in the range of about 3.24 g/cc to about 3.28 g/cc, independent of the nitrided density.

Strength specimens of a size $0.090'' \times 0.220'' \times 0.900''$ are machined from the specimens. The strength at room temperature (measured in four point bending) is 107,500 psi, with a Weibull modulus of 17.8. The strength of the spelcimens at 1200° C. is 82,900 psi, with a Weibull modulus of 21.1.

These test samples are considered by me to demonstrate the desirability of the method of this invention when yttrium oxide is used as the densification aid. A substantial increase in strength is achieved and the physical properties of the specimens are excellent and can be charactertized by being compared with the strengths achieved with hot pressed silicon nitride samples. However, because the initial part are slip cast, finished articles of very detailed configuration can be manufactured rather than the relatively simple shapes that can be manufactured in a hot pressing operation.

EXAMPLE 2

Thin samples are produced as in Example 1 with the exception that they contain only 6 weight percent yttrim oxide as a densification agent. The samples are placed in silicon nitride packing powder containing 9 weight percent yttrium oxide and heated with the heating and pressure cycle described in Example 1.

These test samples have a sintered density of 3.02 g/cc. This particular example shows that the yttrim oxide level in such samples should normally be higher than 6% if one desired to make extremely strong materials, but may be used at this lower level if a less densed part is desired.

EXAMPLE 3

This samples are produced as in Example 1 with the exception that they contain 10% by weight yttrim oxide. These specimens are placed in a silicon nitride packing powder containing 9 weight percent yttrim oxide and heated with pressure of nitrogen as described in conjunction with the cycle described in Example 1.

These specimens have a sintered density of 3.28 g/cc which is relatively dense and results in high strength characteristics.

EXAMPLE 4

Thin test specimens are produced as in Example 1 with the exception that they contain 12% by weight yttrim oxide. These samples are placed in a silicon nitride packing powder containing 9 weight percent yttrim oxide and are heated with pressure applied as described for the cycle described in Example 1.

These test specimens have a sintered density of 3.24 g/cc which meant that they were relatively dense and would have excellent strength characteristics.

EXAMPLE 5

The purpose of this Example is to demonstrate only that the first low pressure nitrogen treatment is effective to cause the open porosity originally found in the reaction bonded silicon nitride specimens to be substantially closed. In order to demonstrate this, test specimens such as those in Example 1 containing 8 weight percent yttrium oxide are placed in a container containing a packing powder of 9 weight percent yttrium oxide with the remainder being silicon nitride. This container is then placed in a graphite resistance heated furnace and heated to a temperature of 1875° C. for a period of four hours with a nitrogen over-pressure of 15 psi. The test specimens are then cooled back to room temperature.

The specimens experience a linear shrinkage of about 6 to 8% and a weight loss in the range of 0.7 to 1.8%. The density of these samples was in a range from about 3.03 to 3.08 g/cc. The open porosity of the finished test specimens was 0.32 to 0.80%. However, after machining off about 0.010 inches from the surface of the test specimens, the open porosity dropped drastically and was measured only to be 0.07%, thus showing that the test specimens' open porosity was sealed slightly below the surface and when the surface porosity was removed, it in effect was the total open porosity of the entire system.

GENERAL INFORMATION

The conditions under which the low pressure nitrogen gas treatment and high pressure nitrogen gas treatment will take place will vary generally in dependence upon the densification aids selected. For example, if yttrium oxide is selected as the densification aid, the low pressure nitrogen gas treatment should be carried out generally at a temperature range from 1825° to 1875° C. with a processing time of one-half to six hours, at a pressure generally in the range of a positive nitrogen pressure up to 100 pounds per square inch of nitrogen pressure. The high pressure nitrogen gas treatment should be carried out at a temperature range of about 1875° to 2000° C. for a period of time from one-half to four hours, with a nitrogen pressure in the range from about 300 to 1500 psi.

If magnesium oxide is used as the densification aid, while similar times and pressures may be used in the two steps, basically the low pressure nitrogen gas treatment should be carried out at a temperature in a range from about 1700° to 1800° C. and the high pressure gas treatment should be carried out in a range from about 1750° to about 1850° C.

As an additional matter, I generally prefer to have about the same amount of densification aid in the packing powder as there is in the article being sintered. For example, if the article contains 6% densification aid, I normally would employ a similar amount of densification aid in the packing powder. If the article had a higher percentage of densification aid, I likewise would employ a higher percentage of densification aid in the packing powder supporting the same. This, of course, is an optional procedure As long as the packing powder does contain a reasonably percentage of the densification aid as an ingredient, increases in strength of the reaction sintered silicon nitride articles will be achieved.

While particular embodiments of the invention have been illustrated and described, it will be obvious to those skilled in the art that various changes and modifications may be made without departing from the invention, and it is intended in the appended claims all such modifications and equivalents as fall within the true spirit and scope of this invention.

What is claimed is:

1. A method of densifying an article formed of reaction bonded silicon nitride, which method comprises the steps of:

packing the reaction bonded silicon nitride article in a packing mixture consisting of silicon nitride powder and a densification aid;

subjecting the reaction bonded silicon nitride article and packing powder to a positive, low pressure nitrogen gas treatment at a pressure up to about 100 psi nitrogen pressure, while heating the reaction bonded silicon nitride article, packing powder and nitrogen gas to a treatment temperature and for a treatment time to cause any open porosity originally found in the reaction bonded silicon nitride article to be substantially closed; and thereafter subjecting the reaction bonded silicon nitride article and packing powder to a positive, high pressure nitrogen gas treatment at a pressure in the range from about 300 psi to about 1500 psi, while heating the reaction bonded silicon nitride article, packing powder and nitrogen gas to a treatment temperature and for a treatment time to cause a sintering of the reaction bonded silicon nitride article whereby the strength of the reaction bonded silicon nitride article is increased.

2. The method of claim 1, wherein said densification aid is selected from the group consisting of magnesium oxide, yttrium oxide, cerium oxide and zirconium oxide.

3. The method of claims 1 or 2, wherein said packing mixture consists of from 4 to 20% by weight of said densification aid, the balance consisting essentially of silicon nitride powder.

4. The method of claim 1, wherein prior to packing the reaction bonded silicon nitride article in said packing mixture ths silicon nitride article is impregnated with the same densification aid which is used in said packing mixture.

5. The method of claims 1, 2 or 4 wherein the densification aid is yttrium oxide, and wherein said low pressure nitrogen gas treatment is carried out a a pressure not greatly in excess of one atmosphere of nitrogen gas, with said treatment temperature not greatly in excess of 1875° C., and with said treatment time not greatly in excess of six hours; and wherein said high pressure nitrogen gas treatment is carried out at a pressure not greatly in excess of 20 atmospheres of nitrogen gas, with said treatment temperature not greatly in excess of 1925° C., and with said treatment time not greatly in excess of four hours.

6. A method of densifying an article formed of reaction bonded silicon nitride, which method comprises the steps of:

incorporating a densification aid into a reaction bonded silicon nitride article;

enclosing the reaction bonded silicon nitride article in a chamber also containing a packing mixture consisting of silicon nitride powder and powder the same as the densification aid incorporated into the reaction bonded silicon nitride article;

subjecting the reaction bonded silicon nitride article and packing mixture to a positive, low pressure nitrogen gas treatment at a pressure up to about 100 psi nitrogen pressure while heating the reaction bonded silicon nitride article, packing mixture and nitrogen gas to a treatment temperature and for a treatment time to cause any open porosity originally found in the reaction bonded silicon nitride article to be substantially closed; and thereafter subjecting the reaction bonded silicon nitride article and packing mixture to a positive, high pressure nitrogen gas treatment at a pressure in the range from about 300 psi to about 1500 psi, while heating the reaction bonded silicon nitride article, packing mixture and nitrogen gas to a treatment temperature and for a treatment time to cause a sintering of the reaction bonded silicon nitride article whereby the strength of the reaction bonded silicon nitride article is increased.

7. The method of claim 6, wherein the reaction bonded silicon nitride article is made by a method wherein starting materials for the article are injection molded and the densification aid is included as one of the starting materials.

8. The method of claim 6, wherein the reaction bonded silicon nitride article is made by a method wherein starting materials for the article are slip cast and the densification aid is included as one of the starting materials.

9. The method of claim 6, wherein the reaction bonded silicon nitride article is made by a method wherein the shape of the article is formed in a slip cast operation and the densification aid is incorporated in the article after formation, but before nitriding thereof.

10. The method of claims 6, 7, 8 or 9, wherein the mixture contained in the chamber is packed about the reaction bonded silicon nitride article.

11. The method of claims 6, 7, 8 or 9 wherein the densification aid is yttrium oxide, and wherein said low pressure nitrogen gas treatment is carried out at a pressure not greatly in excess of one atmosphere of nitrogen gas, with said treatment temperature not greatly in excess of 1875° C., and with said treatment time not greatly in excess of six hours; and wherein said high pressure nitrogen gas treatment is carried out at a pressure not greatly in excess of 20 atmospheres of nitrogen gas, with said treatment temperature not greatly in excess of 1925° C., and with said treatment time not greatly in excess of four hours.

12. A method of densifying an article formed of reaction bonded silicon nitride, which method comprises the steps of:

incorporating a yttrium oxide densification aid into a reaction bonded silicon nitride article;

packing the reaction bonded silicon nitride article in a packing mixture consisting of silicon nitride power and power the same as the densification aid incorporated into the reaction bonded silicon nitride article;

subjecting the reaction bonded silicon nitride article and packing powder to a positive, low pressure nitrogen gas treatment at a pressure in a range from a positive nitrogen gas pressure to about 100 psi, while heating the reaction bonded silicon nitride article, packing powder and nitrogen gas to a treatment temperature in a range from about 1825° C. to about 1875° C., and for a treatment time from about one-half hour to about six hours to cause any open porosity originally found in the reaction bonded silicon nitride article to be substantially closed; and thereafter subjecting the reaction bonded silicon nitride article and packing powder to a positive, high pressure nitrogen gas treatment at a pressure in a range from about 300 psi to about 1500 psi, while heating the reaction bonded silicon nitride article, packing powder and nitrogen gas to a treatment temperature in a range from about 1875° C. to about 2000° C., and for a treatment time from about one-half hour to about four hours to cause a sintering of the reaction bonded silicon nitride article whereby the strength of the reaction bonded silicon nitride article is increased.

13. The method of claim 12, wherein the reaction bonded silicon nitride article is made by a method wherein starting materials for the article are injection molded and the densification aid is included as one of the starting materials.

14. The method of claim 12, wherein the reaction bonded silicon nitride article is made by a method wherein starting materials for the article are slip cast and the densification aid is included as one of the starting materials.

15. The method of claim 12, wherein the reaction bonded silicon nitride article is made by a method wherein the shape of the article is formed in a slip cast operation and the densification aid is incorporated in the article after formation but before nitriding thereof.

* * * * *